US009314857B2

(12) United States Patent
Chiasson et al.

(10) Patent No.: US 9,314,857 B2
(45) Date of Patent: Apr. 19, 2016

(54) CUTTING TOOL WITH QUICK-RELEASE ACTUATED BLADE GUIDE

(71) Applicant: Hubbell Incorporated, Shelton, CT (US)

(72) Inventors: Mark Andrew Chiasson, Merrimack, NH (US); Andrew Beech Johns, Whitefield, NH (US); Cameron Michael-Daniel Torrey, Franconia, NH (US); Peter Matthew Wason, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 108 days.

(21) Appl. No.: 14/043,136

(22) Filed: Oct. 1, 2013

(65) Prior Publication Data

US 2015/0089816 A1 Apr. 2, 2015

(51) Int. Cl.

| | |
|---|---|
| ***B23D 17/00*** | (2006.01) |
| ***B26B 17/00*** | (2006.01) |
| ***B23D 33/02*** | (2006.01) |

(52) U.S. Cl.

CPC ................ *B23D 17/00* (2013.01); *B23D 33/02* (2013.01); *B26B 17/00* (2013.01)

(58) Field of Classification Search

CPC .... B23D 29/02; B23D 29/023; B23D 29/026; B23D 17/00; B23D 17/02; B26B 15/00; B26B 17/00; B26B 17/003; B26B 17/006; B26B 17/02

USPC .................................................... 30/179, 233

See application file for complete search history.

(56) References Cited

U.S. PATENT DOCUMENTS

| | | | |
|---|---|---|---|
| 773,743 | A | 11/1904 | Von Hoffman |
| 1,735,317 | A | 2/1927 | Helwig |
| 1,876,218 | A | 9/1932 | Gee |
| 2,556,559 | A | 6/1951 | Smith |
| 3,340,611 | A | 9/1967 | Lauck |
| 3,628,247 | A | 12/1971 | Lattin et al. |
| 4,026,028 | A | 5/1977 | Green |
| 4,235,016 | A | 11/1980 | Kobelt |
| 4,677,748 | A | 7/1987 | Kobayashi |

(Continued)

FOREIGN PATENT DOCUMENTS

FR 2870430 A3 11/2005

OTHER PUBLICATIONS

International Search Report and the Written Opinion Issued in PCT/US 14/56657 dated Dec. 22, 2014.

(Continued)

*Primary Examiner* — Ned Landrum
*Assistant Examiner* — Richard Crosby, Jr.
(74) *Attorney, Agent, or Firm* — Dickinson Wright PLLC

(57) ABSTRACT

A cutting tool with first and second pivoted shearing blades has a guide member mounted to the first blade for transverse movement relative to the first blade and toward and away from the second blade. The guide member has a transverse restraining surface that confronts a transverse guided surface of the second blade during cutting of a workpiece to resist axial separation of the cutting edges away from the cutting plane. A yieldable, resettable mechanism enables release of an uncut cable captured by the guide member in the event the planned cut is in error or must be postponed. Examples include a ball detent, a magnet, an over-center extension spring arrangement and a torsion spring.

30 Claims, 8 Drawing Sheets

(56) References Cited

U.S. PATENT DOCUMENTS 5,384,962 A * 1/1995 Pemberton ............. A62B 3/005 30/134
5,429,158 A 7/1995 Kurmis
5,542,182 A * 8/1996 Martinez ......................... 30/179
5,653,027 A 8/1997 Wall
5,761,948 A * 6/1998 Malagnoux ..................... 72/325
5,890,667 A * 4/1999 Sakato ................... B23D 17/00 241/264
6,026,671 A * 2/2000 Battenfeld ................. 72/409.12
6,119,970 A * 9/2000 LaBounty .............. B23D 17/00 241/101.73
6,839,969 B2 * 1/2005 Jacobson ............... B23D 17/00 241/101.73
7,373,858 B1 5/2008 Hawkins
2003/0145468 A1 8/2003 Glesser
2004/0010923 A1 1/2004 Guiver
2004/0045173 A1 * 3/2004 Ebert .............................. 30/188
2005/0262697 A1 12/2005 Stein
2007/0214648 A1 * 9/2007 Lazarevic ....................... 30/102
2009/0054898 A1 * 2/2009 Gleason .......................... 606/79
2011/0179930 A1 * 7/2011 Brown et al. ................ 83/639.1
2011/0185577 A1 * 8/2011 Ronan ............................... 30/92
2013/0227843 A1 9/2013 Wason
2014/0020528 A1 * 1/2014 Wason .............................. 83/13

OTHER PUBLICATIONS

Catalog Page: 25CAT Cutter Head Attachment, Huskie Tools, Inc., 2011.

* cited by examiner

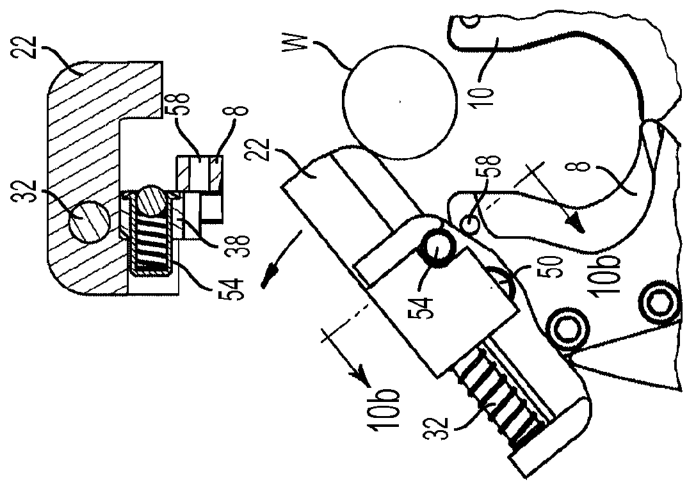
FIG. 10b
FIG. 10a
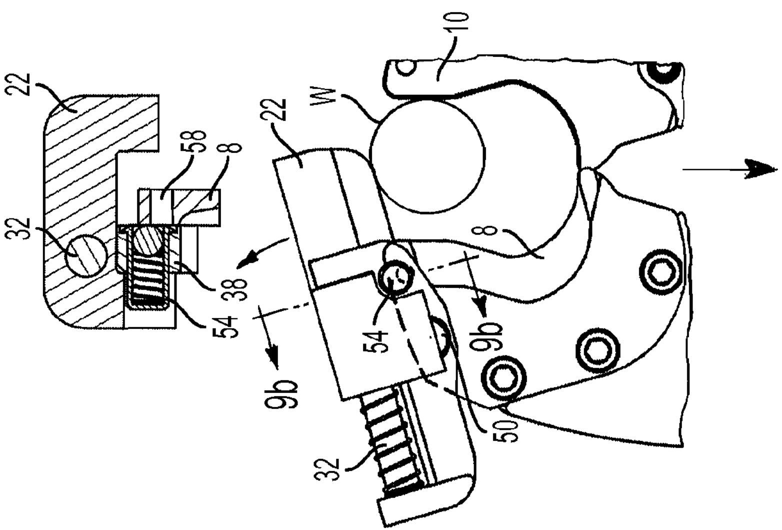
FIG. 9b
FIG. 9a
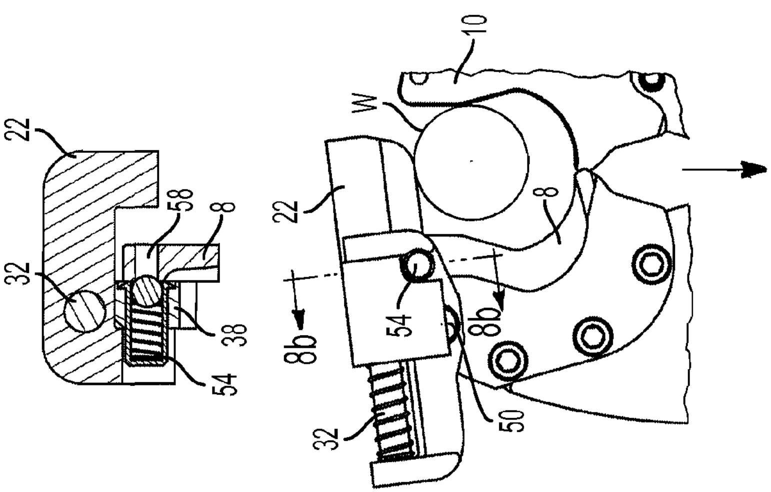
FIG. 8b
FIG. 8a

CUTTING TOOL WITH QUICK-RELEASE ACTUATED BLADE GUIDE

FIELD OF THE INVENTION

The invention relates to cutting tools, in particular, to scissor-action tools having pivoted shearing blades for cutting cables and similar workpieces.

BACKGROUND OF THE INVENTION

Scissor-action tools for cutting cables and similar workpieces have cutting blades that typically are guided when cutting so they do not bend away from each other and from the cutting plane they define. The shearing blade tips must be able to open wide enough to allow a cable to enter through the front of the tool (thus enabling lateral cable engagement) and then travel through the cable until it is severed. Ideally, the blades should travel from fully open to the "guided" position before cutting begins.

SUMMARY OF THE INVENTION

The invention facilitates release of an uncut cable captured by the actuated blade guide of a scissor-action cutting tool in the event the planned cut is in error or must be postponed. An example of a cutting tool having a cable-capturing, actuated blade guide is disclosed as the first embodiment (FIGS. 1-6d) in commonly owned application Ser. No. 13/554,028, filed Jul. 20, 2012 and titled "Cutting Tool with Actuated Blade Guide," which is incorporated by reference herein in its entirety.

The invention broadly encompasses a cutting tool comprising first and second shearing blades and a guide mechanism that resists axial separation of the blades during cutting. The first and second blades are mounted for relative pivotal movement about a blade pivot axis and have respective cutting edges defining therebetween a transverse cutting plane substantially normal to the pivot axis. The first and second blades have respective first and second distal blade portions that define a workpiece-admitting gap and converge transversely as the blades relatively advance from an open position to engage a workpiece disposed between the blades.

A guide mechanism carried by the first blade includes a guide member extending toward the second distal blade portion and constrained to move transversely along a prescribed path relative to the first and second distal blade portions between a fully extended position, in which the guide member spans at least a portion of the gap, and retracted positions in which the guide member occupies lesser portions of the gap. The guide member has a distal end and a transverse restraining surface configured to confront a transverse guided surface of the second distal blade portion during cutting to resist axial separation of the cutting edges away from the cutting plane. A spring biases the guide member toward its fully extended position and allows the guide member to retract when its distal end is urged against a workpiece, the guide member thereafter returning to its fully extended position to capture the workpiece between the cutting blades after the workpiece clears the distal end.

A resettable catch enables tool release from a captured but uncut workpiece in the event the planned cut is in error or must be postponed. The catch normally maintains constrained movement of the guide member along its prescribed path but is yieldable to allow the guide member to move away from its prescribed path and away from the gap between the blades when the guide member is urged forcefully against the uncut captured workpiece, thereby releasing the tool from the workpiece.

The guide mechanism preferably is pivotally attached to the first blade and the resettable catch can yield to allow the guide mechanism to swing transversely from its normal captive position when the tool is to be removed from an uncut captured workpiece. The guide member preferably is supported by and slides along a transversely extending rail.

In one embodiment the resettable catch is in the form of a spring-loaded ball carried by the guide mechanism; in the normal captive position the ball is retained in a recess in the first blade. In another embodiment the resettable catch is in the form of a magnet that keeps the guide mechanism in the captive position. In a further embodiment the resettable catch is in the form of an over-center extension spring arrangement that normally biases the guide mechanism toward the captive position but reverses its bias away from the captive position when the guide mechanism is displaced beyond a null position. In yet another embodiment the guide mechanism is constantly urged toward the captive position by a torsion spring.

BRIEF DESCRIPTION OF THE DRAWING

Several embodiments of the disclosed invention, including the best mode for carrying out the invention, are described in detail below purely as examples, with reference to the accompanying drawing, in which:

FIG. 8*a* is a front elevational view of the cutting tool of FIG. 1 shown in an initial stage of removal from an uncut workpiece;

FIG. 8*b* is a sectional view thereof taken along line 8*b*-8*b* in FIG. 8*a;*

FIG. 9*a* is a front elevational view of the cutting tool of FIG. 1 shown in an intermediate stage of removal from an uncut workpiece;

FIG. 9*b* is a sectional view thereof taken along line 9*b*-9*b* in FIG. 9*a;*

FIG. 10*a*, which is similar to FIG. 7, is a front elevational view of the cutting tool of FIG. 1 shown in a final stage of removal from an uncut workpiece;

FIG. 10*b* is a sectional view thereof taken along line 10*b*-10*b* in FIG. 10*a;*

DETAILED DESCRIPTION OF THE INVENTION

Figure 3:
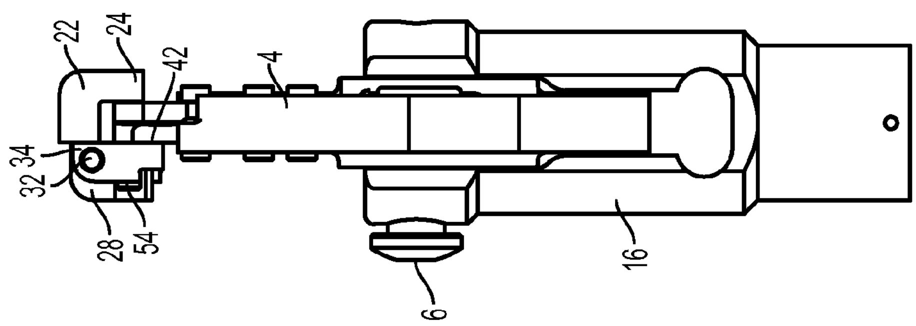
FIG. 3 is a right side elevational view thereof.

Each of the disclosed embodiments of the invention is shown in the drawing figures as a cutting head per se having a pair of pivoted jaws, each jaw supporting a replaceable shearing blade having a cutting edge. The jaw and blade components are substantially identical in all embodiments, so the same reference numbers are used to identify the common parts. The cutting head is adapted to be mounted to a manual or a powered actuator that supplies a force to cause relative pivotal movement of the jaws and, hence, the shearing blades, in a manner well known in this art. As used throughout this application, including the claims, the terms "first blade," "second blade" and "blade" are intended to cover the blades per se as well as their supporting structures, such as their jaws, unless otherwise indicated or implied.

Figure 2:
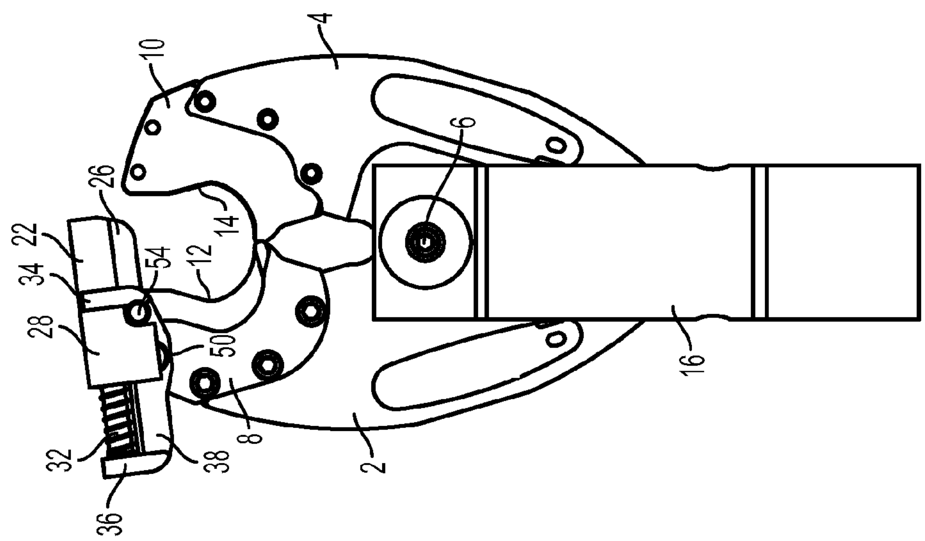
FIG. 2 is a front elevational view thereof.
Figure 1:
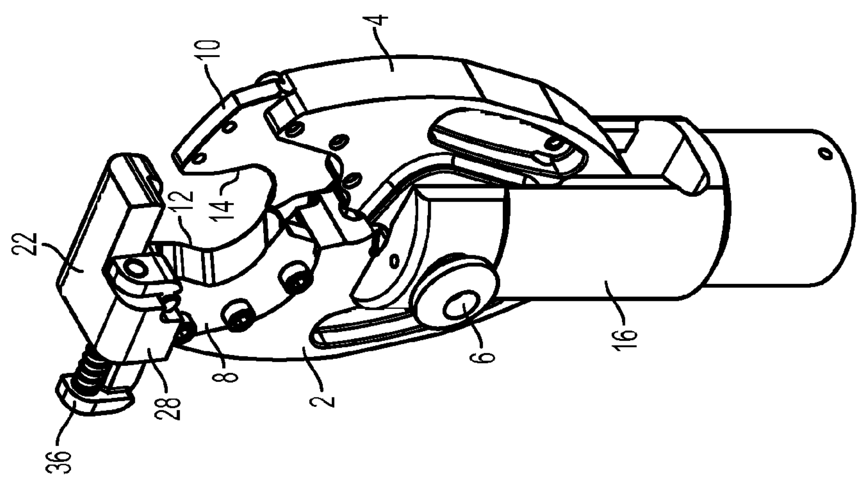
FIG. 1 is a perspective view of a first embodiment of cutting tool according to the invention.

Referring to FIGS. 1-3, a first embodiment of cutting tool according to the invention comprises a first jaw 2 pivoted to a second jaw 4 for relative movement about a pivot axis 6. The cutting end of the tool comprises a first shearing blade 8 bolted to first jaw 2 and a second shearing blade 10 bolted to second jaw 4. Blade 8 has a cutting edge 12, blade 10 has a cutting edge 14, and the two cutting edges 12, 14 define between them a transverse cutting plane substantially normal to pivot axis 6. The powered end of the tool comprises inner surfaces (not shown) on jaws 2, 4 that are spread apart by an advancing actuator member in a manner known in the art, which causes blades 8, 10 to converge and cut through a workpiece (e.g., cable) placed between them. A helical tension spring (not shown) extending between the jaws at the powered end of the tool biases the blades to the open position as shown, also in a manner known in the art. The jaws 2, 4 are shown mounted in a clevis 16, which would be mounted to an actuator.

Figure 5:
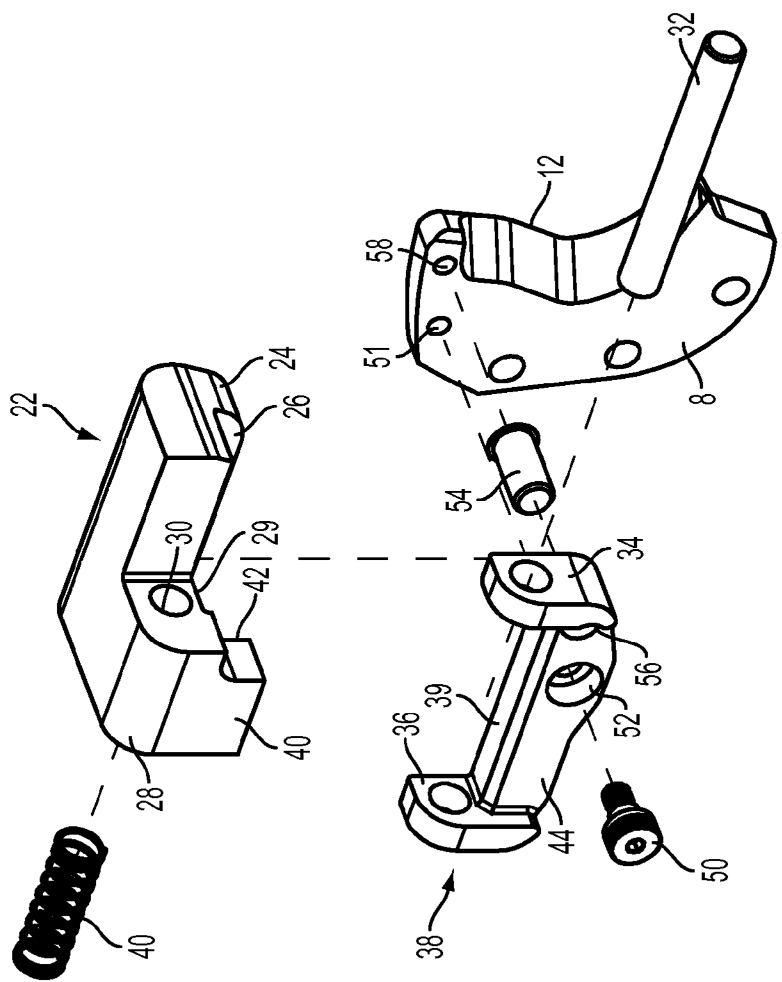
FIG. 5 is an exploded view of the guide mechanism of FIG. 4.
Figure 4:
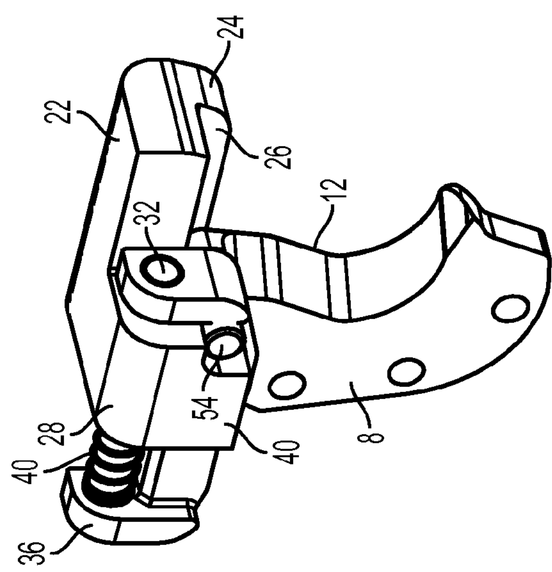
FIG. 4 is a perspective view of the guide mechanism thereof.

Referring further to FIGS. 4 and 5, the blade guide mechanism includes a guide member in the form of an L-shaped arm 22 having a transversely extending flange 24, the inner surface 26 of which confronts the outer surface of blade 10 during cutting. Arm 22 also has a laterally projecting boss 28 with a bore 30 surrounding and slidable along a transversely extending rail (pin) 32. Rail 32 is supported between the front ear 34 and the rear ear 36 of a mounting bracket 38, which is attached to the distal portion of blade 8 as described below. A coil spring 40 surrounds rail 32 between boss 28 and rear ear 36 to bias arm 22 forward toward the distal portion of blade 10. In addition to rail 32, several other structures stabilize arm 22 to keep its flange 24 parallel to the cutting plane: the lower surface 29 of boss 28, which abuts the upper surface 39 of mounting bracket 38; and the inner surface 42 of arm extension 40, which abuts the outer surface 44 of mounting bracket 38.

Figure 6C:
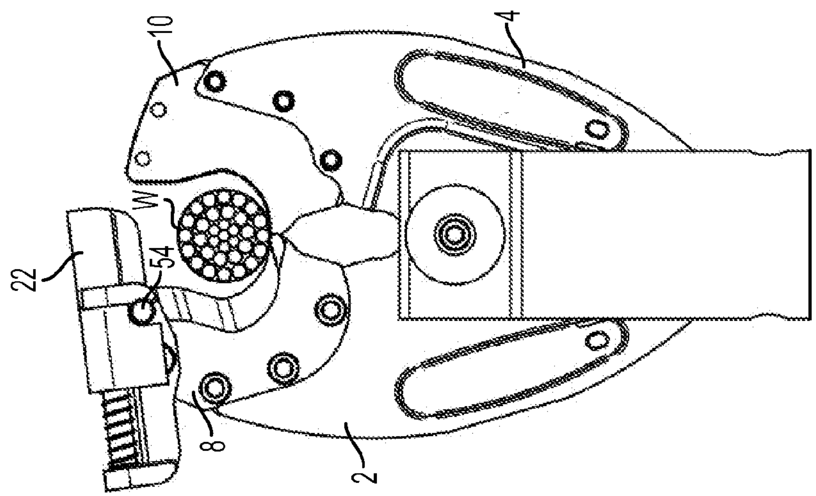
FIGS. 6*a*-6*c* are a front elevational views of the cutting tool of FIG. 1 shown in sequential stages of use in preparation for cutting a workpiece.
Figure 6B:
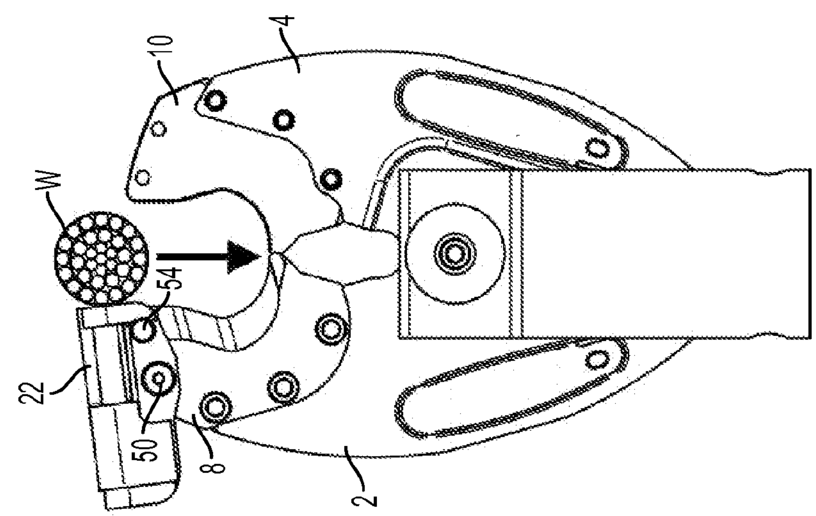
Figure 6A:
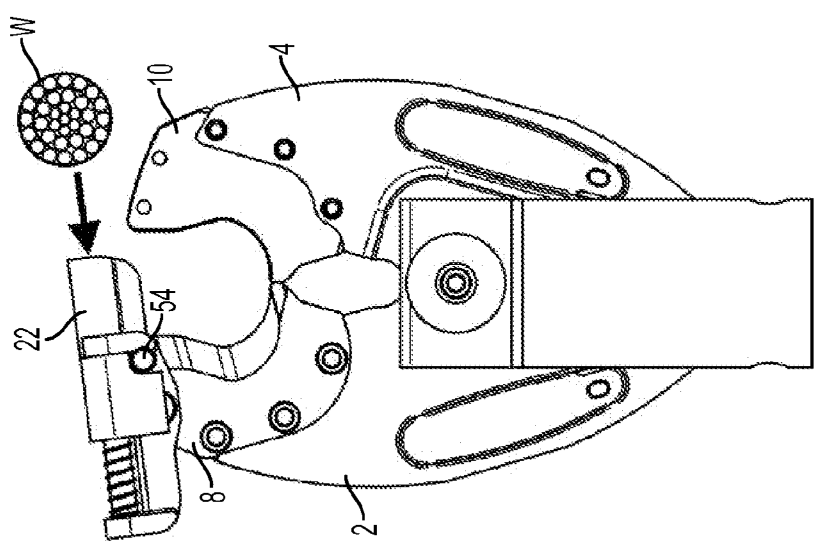

As seen in FIGS. 2 and 6*a*, which show the blades in their fully open state with arm 22 fully extended, arm 22 extends farther from pivot axis 6 than opposing blade 10 so as to facilitate the arm's engagement with a workpiece W (see FIG. 6*b*). In this state, arm 22 spans a substantial portion (e.g., at least half) of the gap defined by the distal portions of blades 8, 10. Preferably, arm 22 spans about 75% of the gap, as shown, so that the arm begins to perform its blade-guiding function very soon after the blade tips begin to converge. In its retracted state with the blades open (see FIG. 6*c*), arm 22 opens the gap sufficiently to allow entry of the largest diameter workpiece specified for cutting. Arm 22 is retracted by urging its free end against a workpiece W (see FIG. 6*b*); and once the arm retracts sufficiently to allow the workpiece to pass between the distal blade portions (see FIG. 6*c*) the tool is simply pushed onto the workpiece, whereupon spring 40 returns the arm to its initial, fully extended position (see FIG. 6*d*), capturing the workpiece between the blades. As the cutting operation commences, inner guide surface 26 of arm 22 promptly confronts the outer surface of blade 10 to resist deflection of the blades away from the cutting plane.

Cable cutting often involves selecting the right cable from among many at a particular job site. If the wrong cable is captured or if the cut must be postponed after cable capture, the tool must be removed from the uncut cable for further use. If the blades are reachable by hand, the guide can be retracted manually along its prescribed linear path. However, cutting tools of this type often are mounted on long handles or poles to afford the reach needed to access overhead or other remote cables. In those instances manual retraction of the guide would be very difficult if not impossible and the tool would then be rendered unusable, hanging from the uncut cable. The invention includes an easily operable quick-release feature that enables removal of the tool from an uncut workpiece. In the present example, this feature is afforded by the yieldable nature of the attachment of mounting bracket 38 to blade 8.

Referring to FIGS. 5 and 6*b*, mounting bracket 38 is attached to blade 8 by a cap screw 50 threaded into a hole 51 in blade 8 (see FIG. 5). The cylindrical head of cap screw 50 closely resides in a recess 52 in mounting bracket 38 and serves as a pivot (release axis) about which the bracket can swing. Mounting bracket 38 is held in the normal (captive) position shown in FIGS. 2 and 6*c* by a spring-loaded ball catch (ball detent) 54, which is snugly held in a hole 56 in bracket 38 and serves as a pivot for the bracket. The spring of ball catch 54 urges the ball toward blade 8, where it normally rests in a retention recess in blade 8 during normal cutting use (see FIG. 8*b*). The retention recess can be a blind hole or a through hole 58, as shown. The retention force afforded by ball catch 54 should be strong enough to support the weight of the tool and any pole to which it is attached so that the tool can hang from an overhead cable and not inadvertently release from the cable.

Figure 7:
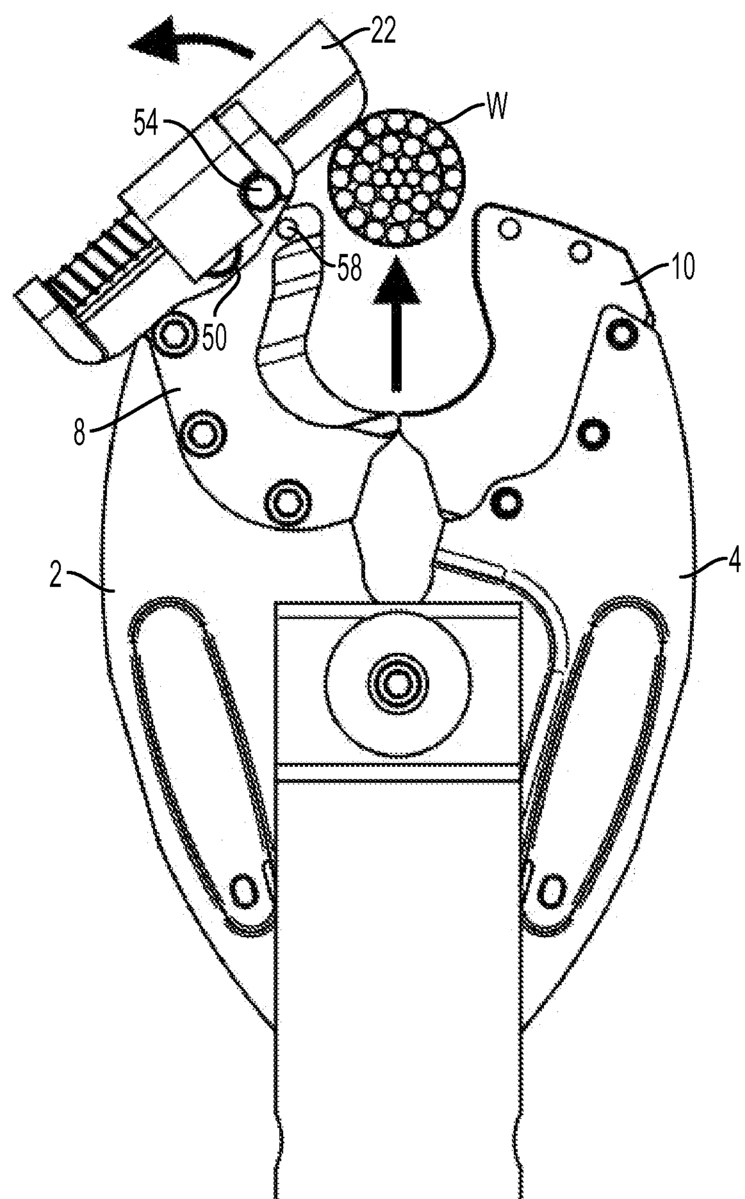
FIG. 7 is a front elevational view of the cutting tool of FIG. 1 shown as it is freed from an uncut workpiece.

If the tool is to be removed from a captured but uncut workpiece, the tool is simply pulled against the workpiece forcefully (see FIG. 8*a*). The resulting outward force exerted on arm 22 overcomes the spring force of ball catch 54, forcing the ball out of retention hole 58 and allowing mounting bracket 38 (with arm 22) to swing outwardly about cap screw 50 (see FIGS. 9*a*, 9*b*). When the ball has cleared the outer edge of blade 8 (see FIG. 10*b*), the space between blades 8 and 10 is wide enough to free the tool from the workpiece (see FIGS. 7 and 10*a*). Thereafter, manually pressing arm 22 inward (either by hand or against a stationary surface) will again overcome the spring force of ball catch 54 and reset mounting bracket 38 (and arm 22) to the normal (captive) position with the ball returned to hole 58. Stops (not shown) placed at appropriate locations may be used to limit the pivot range of bracket 38.

Figure 11:
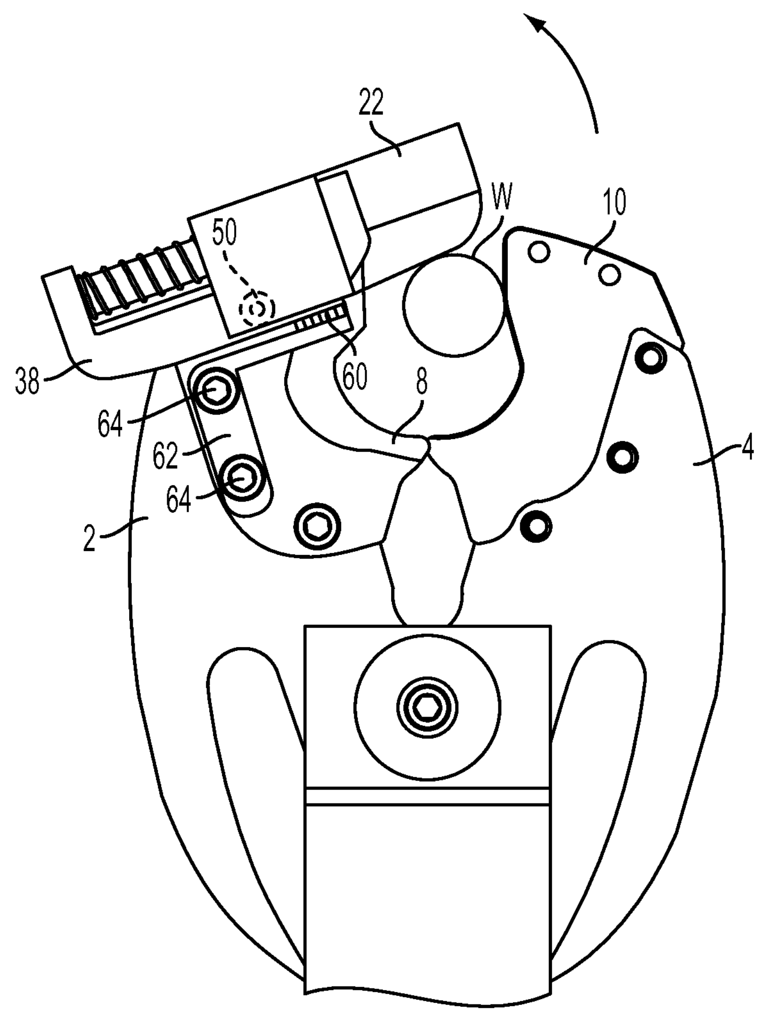
FIG. 11 is a front elevational view of a second embodiment of cutting tool according to the invention.

Referring to FIG. 11, a second embodiment of cutting tool according to the invention utilizes a permanent magnet 60 to provide a retention force that keeps the steel mounting bracket 38 in the normal (captive) position. Magnet 60 is mounted at the end of one leg of an L-bracket 62 whose other leg is secured to blade 8 by two screws 64, which also secure blade 8 to jaw 2. Normally the magnet engages and holds the mounting bracket in the captive position as shown. A forceful pull of the tool against a captured workpiece will overcome the magnetic retention force and release the tool. An alternative arrangement (not shown) would have the magnet secured to the mounting bracket and the magnet would engage and hold the adjacent end of the blade-mounted L-bracket or other blade-carried structure. Both arrangements are reset to the captive position manually in the manner described above for the first embodiment. In both arrangements, the retention force afforded by the magnet should be strong enough to support the weight of the tool and any pole to which it is attached so that the tool can hang from an overhead cable and not inadvertently release from the cable.

Figure 12:
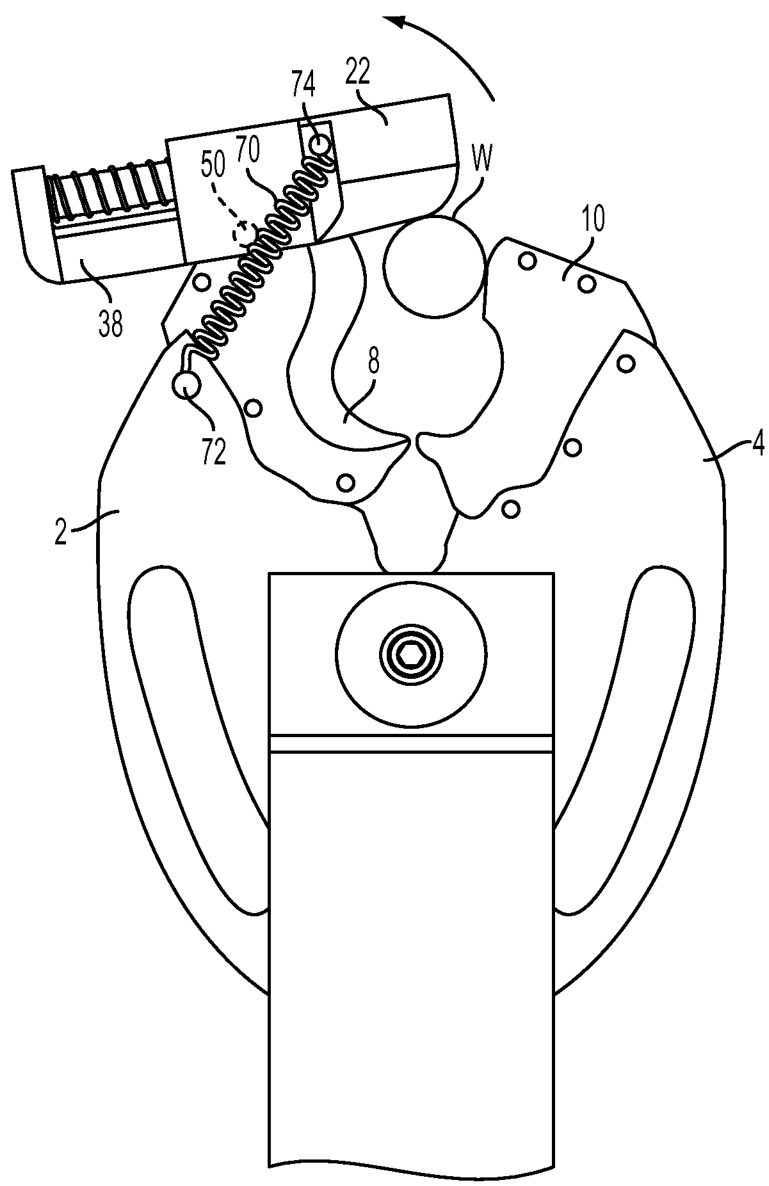
FIG. 12 is a front elevational view of a third embodiment of cutting tool according to the invention.

Referring to FIG. 12, a third embodiment of cutting tool according to the invention utilizes an extension spring 70 to provide a retention force that keeps the mounting bracket 38 in the normal (captive) position. Spring 70 is anchored at one end 72 to blade 8 (jaw 2) and at the other end 74 to mounting bracket 38. In the captive position shown, spring 70 passes to the right of cap screw 50, exerting a closing (clockwise) torque on mounting bracket 38 to keep it in its captive position. When the tool is pulled forcefully against a captured workpiece, mounting bracket 38 will begin to swing outwardly (counterclockwise) about cap screw 50 (as shown by the arrow) against the clockwise torque exerted on it by the extending spring 70. When spring 70 passes to the left of cap screw 50 beyond a null position, the spring force begins to exert a counterclockwise torque on mounting bracket 38, which quickly forces the mounting bracket to its release position where it is held by the spring force. Mounting bracket 38 is reset to the captive position manually as described above but against the counterclockwise torque exerted on mounting bracket 38 until the bracket passes the null position, whereupon the clockwise torque exerted by the spring snaps the bracket back to its captive position. The retention force afforded by the extension spring 70 should be strong enough to support the weight of the tool and any pole to which it is attached so that the tool can hang from an overhead cable and not inadvertently release from the cable.

Figure 13:
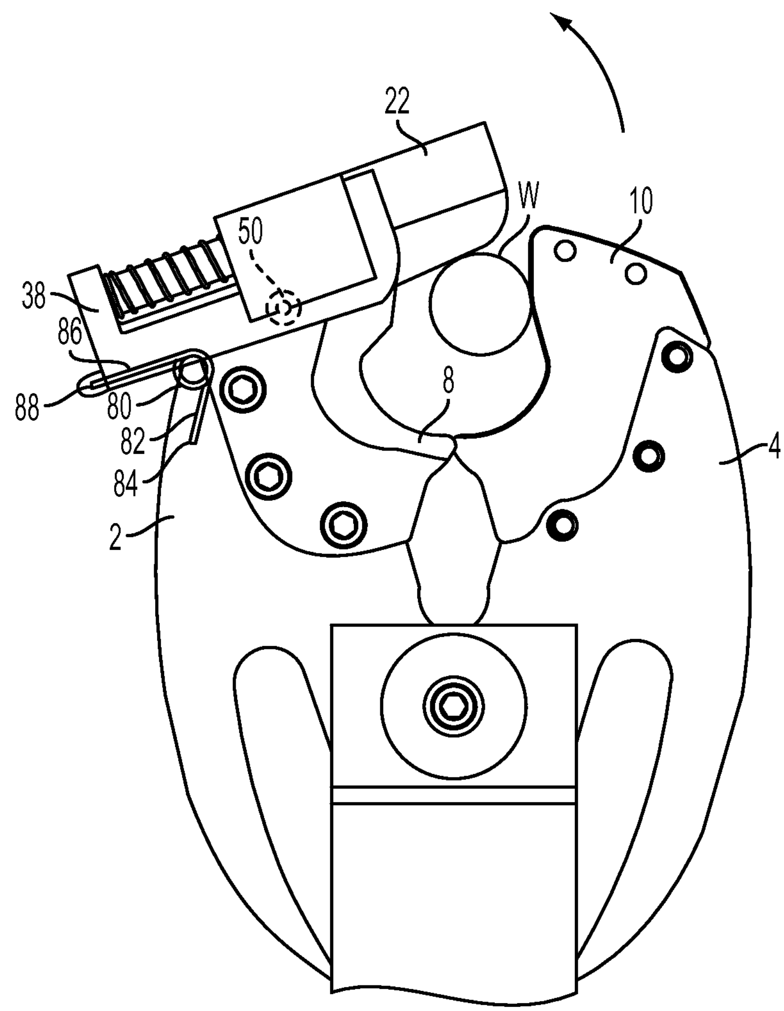
FIG. 13 is a front elevational view of a fourth embodiment of cutting tool according to the invention.

Referring to FIG. 13, a fourth embodiment of cutting tool according to the invention utilizes a torsion spring 80 to provide a retention force that keeps the mounting bracket 38 in the normal (captive) position. Spring 80 has a lower leg 82 anchored at its end 84 to blade 8 (jaw 2) and an upper leg 86 anchored at its end 88 to the rear of mounting bracket 88. In the captive position shown, spring 80 is in compression, i.e., it exerts a clockwise torque on mounting bracket 38. When the tool is pulled forcefully against a captured workpiece, mounting bracket 38 swings outwardly (counterclockwise) about cap screw 50 (as shown by the arrow) against the clockwise torque of spring 80. Once the tool is released from the workpiece, the spring automatically forces mounting bracket 38 clockwise back to its captive position. The retention force afforded by the torsion spring 80 should be strong enough to support the weight of the tool and any pole to which it is attached so that the tool can hang from an overhead cable and not inadvertently release from the cable.

While several embodiments have been chosen to illustrate the invention, it will be understood by those skilled in the art that various changes and modifications may be made without departing from the scope of the invention as defined by the appended claims.

What is claimed is:

1. A cutting tool comprising:

first and second shearing blades mounted for pivotal movement about a blade pivot axis and having respective cutting edges defining therebetween a transverse cutting plane substantially normal to said blade pivot axis, said first and second blades having respective first and second distal blade portions defining a workpiece-admitting gap therebetween when the blades are open and converging transversely as the blades advance to engage a workpiece disposed between the blades;

a guide mechanism pivotally attached to the first blade and including:

a guide member extending toward the second distal blade portion and constrained to move transversely along a prescribed path with respect to the first and second distal blade portions between a fully extended position in which said guide member spans at least a portion of said gap and retracted positions in which said guide member spans lesser portions of said gap, said guide member having a distal end and an inner surface configured to confront an outer surface of the second distal blade portion during cutting to resist axial separation of the cutting edges away from the cutting plane, a spring biasing said guide member toward said fully extended position, the spring allowing said guide member to retract along its prescribed path to admit a workpiece between the blades and then returning said guide member along its prescribed path to its fully extended position to capture the workpiece between the blades; and a resettable catch maintaining constrained movement of said guide member along its prescribed path and yieldable to allow said guide member to move away from its prescribed path and away from said gap when said guide member is urged forcefully against an uncut captured workpiece disposed between the blades, thereby releasing the tool from the workpiece.

2. The cutting tool of claim 1, wherein said guide member spans at least half of said gap when the blades are open.

3. The cutting tool of claim 2, wherein when the blades are open, said guide member extends farther from said blade pivot axis than the second distal blade portion.

4. The cutting tool of claim 3, wherein the prescribed path of said guide member is linear.

5. The cutting tool of claim 1, wherein said guide mechanism comprises a transversely extending rail supporting said guide member for sliding movement therealong.

6. The cutting tool of claim 5, wherein said guide mechanism further comprises a mounting bracket carried by the first distal blade portion and having two transversely spaced ears supporting said rail; said guide member comprises a boss captured by said rail and slidable therealong in the space between said ears; and said spring surrounds said rail between said boss and the ear farther from said gap.

7. The cutting tool of claim 6, wherein said guide member comprises a transversely extending flange spaced from said boss that confronts the outer surface of the second distal blade portion during cutting.

8. The cutting tool of claim 1, wherein a part of said catch is carried by the guide mechanism and a cooperating part of the catch is carried by the first blade.

9. The cutting tool of claim 8, wherein said catch comprises a spring-loaded ball carried by the guide mechanism and a ball-retaining recess in the first blade.

10. The cutting tool of claim 9, wherein the guide mechanism comprises a mounting bracket movably mounted to the first blade and said spring-loaded ball is carried by said mounting bracket.

11. A cutting tool comprising:

first and second shearing blades mounted for pivotal movement about a blade pivot axis and having respective cutting edges defining therebetween a transverse cutting plane substantially normal to said blade pivot axis, said first and second blades having respective first and second distal blade portions defining a workpiece-admitting gap therebetween when the blades are open and converging transversely as the blades advance to engage a workpiece disposed between the blades, and a guide mechanism pivotally attached to the first blade for transverse swinging movement about a release axis and including:

a guide member extending toward the second distal blade portion and constrained to move transversely along a prescribed path with respect to the first and second distal blade portions between a fully extended position in which said guide member spans at least a portion of said gap and retracted positions in which said guide member spans lesser portions of said gap, said guide member having a distal end and an inner surface configured to confront an outer surface of the second distal blade portion during cutting to resist axial separation of the cutting edges away from the cutting plane;

a spring biasing said guide member toward said fully extended position, the spring allowing said guide member to retract along its prescribed path to admit a workpiece between the blades and then returning said guide member along its prescribed path to its fully extended position to capture the workpiece between the blades; and a resettable catch holding the guide mechanism in a captive position on the first blade and yieldable to allow the guide mechanism to swing away from said captive position when said guide member is urged forcefully against an uncut captured workpiece disposed between the blades, whereby said guide member moves transversely away from its prescribed path and away from said gap to release the tool from the workpiece.

12. The cutting tool of claim 11, wherein said guide member spans at least half of said gap when the blades are open.

13. The cutting tool of claim 12, wherein when the blades are open, said guide member extends farther from said blade pivot axis than the second distal blade portion.

14. The cutting tool of claim 13, wherein the prescribed path of said guide member is linear.

15. The cutting tool of claim 11, wherein said guide mechanism comprises a transversely extending rail supporting said guide member for sliding movement therealong.

16. The cutting tool of claim 15, wherein said guide mechanism further comprises a mounting bracket carried by the first distal blade portion and having two transversely spaced ears supporting said rail; said guide member comprises a boss captured by said rail and slidable therealong in the space between said ears; and said spring surrounds said rail between said boss and the ear farther from said gap.

17. The cutting tool of claim 16, wherein said guide member comprises a transversely extending flange spaced from said boss that confronts the outer surface of the second distal blade portion during cutting.

18. The cutting tool of claim 11, wherein a part of said catch is carried by the guide mechanism and a cooperating part of the catch is carried by the first blade.

19. The cutting tool of claim 18, wherein said catch comprises a spring-loaded ball carried by the guide mechanism and a ball-retaining recess in the first blade.

20. The cutting tool of claim 19, wherein the guide mechanism comprises a mounting bracket pivotally mounted to the first blade and said spring-loaded ball is carried by said mounting bracket.

21. A cutting tool comprising:

first and second shearing blades mounted for pivotal movement about a blade pivot axis and having respective cutting edges defining therebetween a transverse cutting plane substantially normal to said blade pivot axis, said first and second blades having respective first and second distal blade portions defining a workpiece-admitting gap therebetween when the blades are open and converging transversely as the blades advance to engage a workpiece disposed between the blades, and a guide mechanism pivotally attached to the first blade for transverse swinging movement about a release axis and including:

a guide member extending toward the second distal blade portion and constrained to move transversely along a prescribed path with respect to the first and second distal blade portions between a fully extended position in which said guide member spans at least a portion of said gap and retracted positions in which said guide member spans lesser portions of said gap, said guide member having a distal end and an inner surface configured to confront an outer surface of the second distal blade portion during cutting to resist axial separation of the cutting edges away from the cutting plane;

a spring biasing said guide member toward said fully extended position, the spring allowing said guide member to retract along its prescribed path to admit a workpiece between the blades and then returning said guide member along its prescribed path to its fully extended position to capture the workpiece between the blades; and means for holding the guide mechanism in a captive position on the first blade and yieldable to allow the guide mechanism to swing away from said captive position and toward a release position when said guide member is urged forcefully against an uncut captured workpiece disposed between the blades, whereby said guide member moves transversely away from its prescribed path and away from said gap to release the tool from the workpiece.

22. The cutting tool of claim 21, wherein the prescribed path of said guide member is linear.

23. The cutting tool of claim 21, wherein said means for holding comprises a spring-loaded ball carried by the guide mechanism and a ball-retaining recess in the first blade.

24. The cutting tool of claim 21, wherein said means for holding comprises a magnet exerting a holding force on the guide mechanism when in said captive position.

25. The cutting tool of claim 24, wherein the magnet is carried by the first blade and contacts the guide mechanism when in said captive position.

26. The cutting tool of claim 21, wherein said means for holding comprises an extension spring anchored at a first end to the first blade and anchored at a second end to the guide mechanism beyond said release axis.

27. The cutting tool of claim 26, wherein the extension spring is disposed between said gap and said release axis when the guide mechanism is in said captive position.

28. The cutting tool of claim 27, wherein said release axis is disposed between said gap and said extension spring when the guide mechanism is in said release position.

29. The cutting tool of claim 21, wherein said means for holding comprises a torsion spring biasing the guide mechanism toward said captive position.

30. The cutting tool of claim 29, wherein the torsion spring is carried by the first blade and has a first end anchored to the first blade and a second end anchored to the guide mechanism.

* * * * *